Jan. 4, 1938. H. V. LUDWICK 2,104,565
SAFETY ATTACHMENT FOR TRUCK WHEELS
Filed Nov. 22, 1934
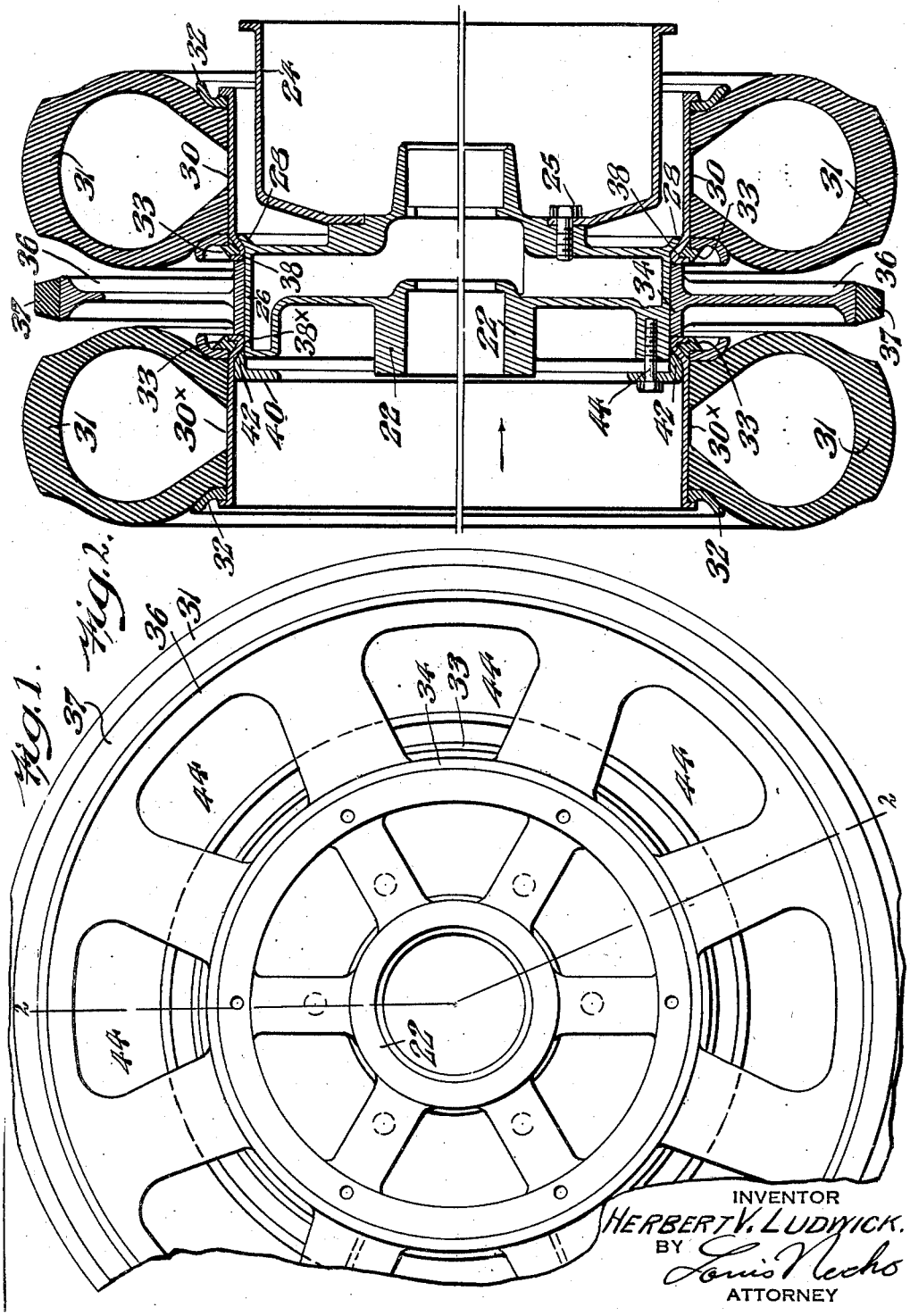
INVENTOR
HERBERT V. LUDWICK.
BY
ATTORNEY Patented Jan. 4, 1938

2,104,565

UNITED STATES PATENT OFFICE 2,104,565

SAFETY ATTACHMENT FOR TRUCK WHEELS

Herbert V. Ludwick, Dearborn, Mich.

Application November 22, 1934, Serial No. 754,208

1 Claim. (Cl. 301—39)

My invention relates to a new and useful safety attachment of the general type disclosed in my co-pending applications Nos. 716,589 now Patent No. 1,992,078 and 716,590, now Patent No. 1,992,079, the present construction having more particular reference to a safety attachment especially adapted for use in connection with wheels on heavy duty trucks and trailers whereby an auxiliary cushioned support is provided for taking up the load in the event of a sudden or gradual deflation of one or both of the pneumatic tires carried by the wheels.

My invention further relates to a safety attachment of the type mentioned, which is inexpensive to manufacture, easy to assemble, and which can be applied to wheel constructions now on the market without materially interfering with their present construction and assembly.

The construction, manner of operation, and assembly will be more clearly set forth in the following specification in connection with the accompanying drawing in which:

Fig. 1 represents a fragmentary side elevation of a dual wheel assembly embodying my invention, one of the wheels being removed to show details of construction.

Fig. 2 represents a section on line 2—2 of Fig. 1.

In Figs. 1 and 2, I have shown a construction in which I utilize a hub 22, on the inboard side of which is secured the brake drum 24 by the bolts 25. The hub 22 is provided with the annular horizontal seat 26 and with the annular deflected flange 28 of a diameter slightly greater than the diameter of the hub measured at the annular seat 26. The rims 30 and 30x carry pneumatic or other tires 31 which are secured in position by the conventional side rings 32 and locking rings 33. Intermediate the rims 30 and 30x is positioned the safety attachment embodying my invention which consists of the annular member 34 adapted to fit snugly upon the annular seat 26 at the periphery of the hub 22 and the disc or spoke member 36 which is integral with the annular member 34 and which preferably carries the cushion thread 37. In this assembly the inboard rim 30 with the tire 31 mounted thereon is first slid over the seat 26 of the drum 22 in the direction of the arrow until the deflected end 38 of the rim 30 bears against the oppositely deflected flange 28 which limits the inboard movement of the rim 30 and its adjuncts. The safety attachment is then slid over the drum, also in the direction of the arrow, until the horizontal annular member 34 thereof engages the seat 26 on the periphery of the hub and until the adjacent or inboard edge thereof abuts against the deflected edge 38 of the inboard rim 30. The outboard rim 30x with its adjuncts is next slid over the hub 22 until the deflected end 38x thereof rests upon the adjacent portion of the seat 26 and abuts against the adjacent edge of the horizontal annular member 34 of the safety attachment, all as shown in Fig. 2. A locking ring 40 having a wedge-shaped flange 42 is then placed in position, as shown in Fig. 2, with the wedge-shaped flange 42 thereof inserted between the deflected end 38x of the rim 30x and the corresponding portion of the seat 26 on the hub 22, the locking ring 40 being then clamped in position by a series of bolts or their equivalents 44. In this construction the deflected end 38 of the rim 30 bears against the flange 28, the adjacent edge of the annular member 34 of the safety attachment abuts against the deflected end 38 of the rim 30, the deflected end 38x bears against the seat 26 and the adjacent edge of the annular member 34, and finally the wedge-shaped flange 42 of the locking ring 40 retains the entire assembly rigidly in position. In this construction the safety attachment may be formed of a disc having cut-out portions 44 therein or may be formed of a spoke construction as may be desired.

While I have shown and described my invention as applied to a dual truck wheel assembly, it is to be understood that my novel attachment can be equally well applied to single wheels or tandem wheels without departing from the scope of the invention.

It will thus be seen that I have devised a novel safety attachment which is adapted to take the load in the event of deflation of the corresponding tire and that my novel safety attachment is easily and practicably applied to present day constructions without interfering with their conventional assembly. Furthermore, my novel attachment is of the lightest possible construction consistent with the necessary rigidity and also serves to agitate a current of air calculated to cool the wheel assembly. It will be further seen that in the construction shown in Figs. 1 and 2 the safety attachment when applied to a dual wheel construction serves as a spacer between the two wheel assemblies, thereby adding to the rigidity of the construction.

I claim:

A dual wheel assembly comprising a hub, a felly carried by said hub and having a peripheral annular seat, a flange formed on the inboard side of said seat, a tire supporting rim mounted on said seat and having a deflected portion engaging said flange, a safety attachment carried by said seat and abutting against the inclined portion of said rim, a second tire supporting rim mounted on said seat and abutting against the juxtaposed edge of said safety attachment, and means for securing said second rim to said hub.

HERBERT V. LUDWICK.